Patented Nov. 18, 1952

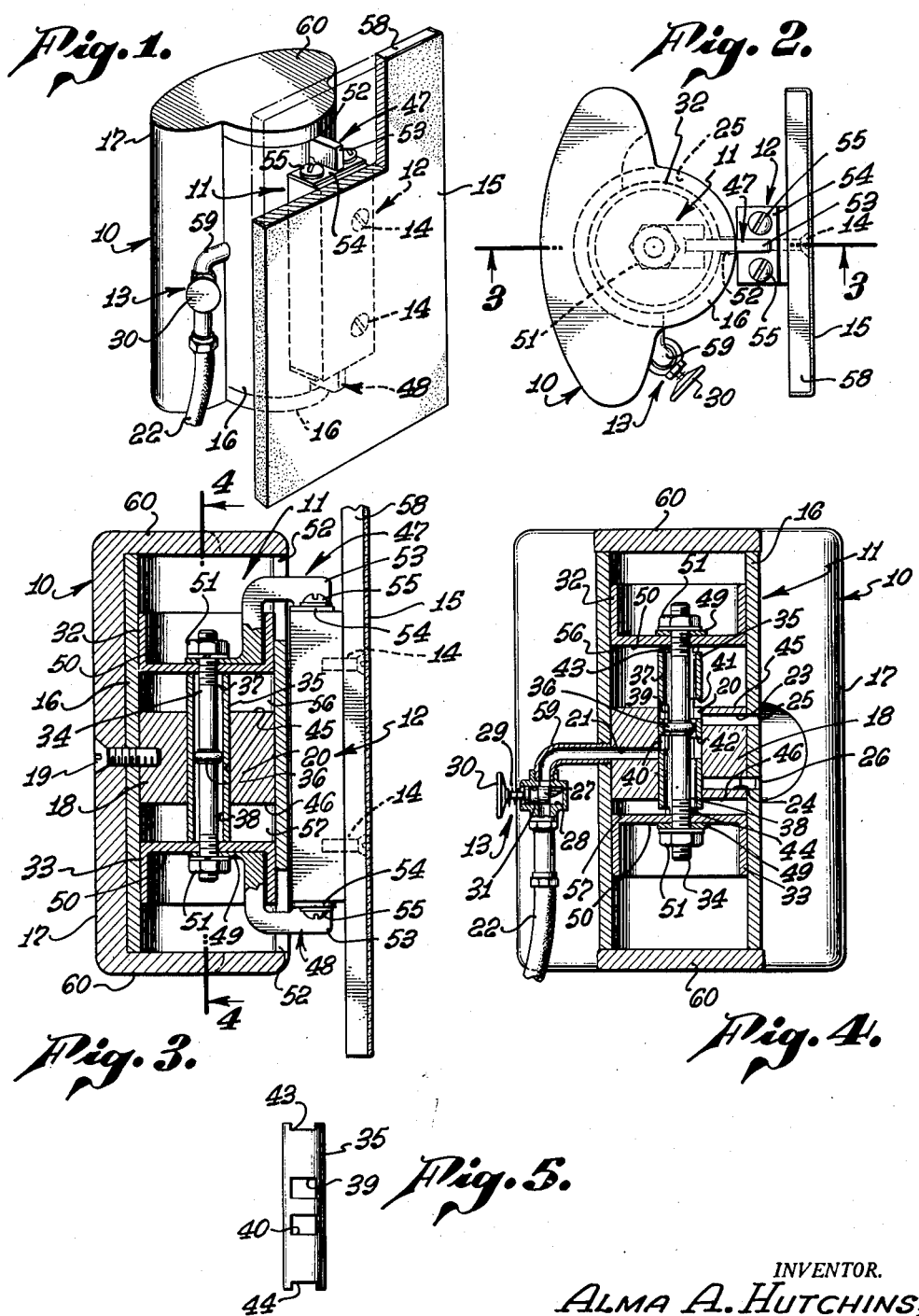

2,618,242

UNITED STATES PATENT OFFICE 2,618,242

RECIPROCATING TOOL ACTUATING DEVICE

Alma A. Hutchins, Pasadena, Calif.

Application February 21, 1949, Serial No. 77,461

7 Claims. (Cl. 121—30)

This invention relates generally to improved tool actuating devices, and concerns more particularly novel pneumatically powered units for reciprocating sanders, files, saws, and the like.

As is well known, the work engaging portion of a reciprocating tool is generally susceptible to rather rapid wear unless operated at a fairly high speed. Consequently, a major object of the invention is to provide a tool actuating device operable at a relatively high reciprocating speed for assuring maximum useful life of the carried tool. This result is effected by the employment of a fluid pressure operated mechanism designed to be power driven in reverse directions and especially adapted for rapid reversal of motion at either end of its travel. Specifically, I provide a new type of pneumatic control valve operable to quickly and automatically alter the course of fluid flow in accordance with reciprocating motion of a pair of power pistons. Preferably, the valve means are carried by and between a pair of opposed pistons to which pressure fluid is alternately admitted.

A further object of the invention is to provide a reciprocating tool actuating device of such simplicity as to minimize the possibility of mechanical failure and to permit the use of power driven sanders and the like where the cost of such tools has previously prevented their use. In accordance with the invention, I employ a single moving unit comprising valve and piston means movable together and directly carrying a tool holder.

The above and further features and objects of the present invention will be better understood from the following detailed description of the typical embodiment illustrated in the accompanying drawing, in which:

Fig. 1 is a perspective view of a tool actuating device with a sanding block attached;

Fig. 2 is a plan view of the device shown in Fig. 1;

Fig. 3 is a longitudinal section taken on line 3—3 of Fig. 2;

Fig. 4 is a longitudinal section taken on line 4—4 of Fig. 3; and

Fig. 5 is a side elevation of the slide valve.

The illustrated tool reciprocating device comprises essentially a body section generally indicated at 10, a piston and valve assembly 11 adapted for bodily reciprocation within section 10, tool holder 12 carried by and movable with the piston and valve assembly, and finger operated control valve 13. Though, of course, any convenient type of reciprocating tool may be carried by tool holder 12, the device is typically illustrated as carrying a sanding block 58, secured to the holder by screws 14 and presenting on its work engaging surface sand paper 15.

Body section 10 includes a cylinder 16, at one side of which is carried elongated handle 17 having transverse flanges 60 at its ends disposed across and closing opposite ends of the cylinder. Cylindrical insert or valve block 18, of an external diameter corresponding to the internal diameter of cylinder 16, is located centrally within the cylinder, as seen in handle 17 and cylinder 16, and into insert 18 to rigidly retain these three members in the illustrated relation.

As seen in Fig. 4, insert 18 contains an axially extending central bore 20, within which the slide valve is receivable, as will later appear. The insert also contains a radially extending inlet passage 21 communicating with inlet line 22 through L connection 59 and control valve 13. Extending radially in a direction opposite passage 21, the insert contains a pair of axially spaced fluid discharge passages or slots 23 and 24, registering with escape slots 25 and 26 of the cylinder.

Valve 13 is of known type having a plunger 27 axially movable in barrel 28 and normally urged by coil spring 29 to the closing positions shown in Fig. 4. As will be understood, plunger 27 may be actuated axially to the right, as seen in Fig. 4, by finger pressure exerted against button 30, to permit passage of compressed air or other pressure fluid about annular groove 31 of the plunger and into inlet passage 21 of the valve insert.

Assembly 11 comprises essentially a pair of opposed pistons 32 and 33 centrally interconnected by an axially extending piston rod assembly including an inner rod 34, an outer valve tube 35, and a seal ring 36. Valve tube 35 is disposed about rod 34 between the two pistons and has an external diameter corresponding to the internal diameter of bore 20 in the valve block to permit flow controlling cooperation with the block. The internal diameter of tube 35 is appreciably greater than the external diameter of rod 34 to form with the rod an annular space through which pressure fluid is directed. O-ring 36 is disposed about rod 34 at its center to form a seal between the rod and the inner surface of the tube, dividing the annular clearance space between the tube and rod into a pair of fluid conducting passages 37 and 38. At opposite sides of O-ring 36, tube 35 contains a pair of inlet ports 39 and 40, and a pair of outlet ports 41 and 42, adapted to cooperate with the inlet and outlet passages of the valve insert or block. At its ends, tube 35 presents openings or notches 43 and 44, communicating respectively with upper and lower cylinder spaces 56 and 57 between the pistons and the transverse end surfaces 45 and 46 of the valve insert.

Each of the tool holder brackets 47 and 48 has an inner arm 49 clamped against the outer end surface 50 of its respective piston, and having an opening permitting its reception about the corresponding end of rod 34. Thus, nuts 51 may be tightened on the ends of rod 34 to rigidly retain the tool holder brackets, the pistons, the rod and tube 35 in the illustrated relative positions for movement together as a unit.

Cylinder 16 has a longitudinally extending slot 52 at each end through which the axially offset outwardly projecting portion 53 of the corresponding tool holder bracket extends. Tool holder 12 is secured, at its ends, to transverse flanges 54 of the brackets, as by screws 55. As previously brought out, the sanding board or other tool is removably secured to the tool holder by screws 14.

In using the device, pressure fluid inlet 22, preferably supplying compressed air, is secured to the intake side of valve 13, as shown in Figs. 1 and 4. The operator may then hold the device by handle 17 and, by exerting finger pressure on button 30, move plunger 27 of valve 13 inwardly to the open or fluid passing position. With the valve thus actuated, compressed air is permitted to pass through passage 21 and into whichever of the two intake ports 39 and 40 of valve tube 35 happens to be in registry with the intake passage. For instance, if the piston and valve assembly is in the position illustrated in Fig. 4, air passes from inlet passage 21 through valve port 40, axially along annular passage 38, and radially outwardly through openings 44 into lower cylinder space 57 to move piston 33 downwardly. At the same time, upper cylinder space 56 is in communication with discharge passage 23 through end openings 43 of the valve tube, annular passage 37, and discharge port 41. Thus, the upper cylinder space is permitted to discharge during the downward power stroke of the lower piston. As the piston and valve assembly moves downwardly, valve tube 35 slides within block 18 to reverse the valve connections for the upward power stroke. That is, inlet port 39 moves into registry with inlet passage 21 to supply air beneath piston 50, and discharge port 42 moves to a point opposite discharge passage 24 to permit escape of the air from the lower cylinder space 57. Consequently the assembly reverses direction and moves upwardly under the influence of the air in space 57. This reciprocating motion continues as long as valve 13 remains open, and is transmitted directly to sanding block 58.

I claim:

1. A reciprocating tool actuating device, comprising a body, a pair of opposed pistons within said body and movable by fluid pressure in opposite directions, a rod interconnecting said pistons, a tube of greater internal diameter than the external diameter of said rod and disposed about said rod between said pistons to form an annular space, said tube and rod being movable with said pistons, an annular seal ring disposed about said rod and within said tube at a central location to form a fluid seal therebetween dividing said annular space longitudinally into a pair of annular fluid passages, pressure fluid inlet means, and fluid discharge means, said tube having wall apertures in communication with said annular passages adapted to cooperate with said inlet means upon reciprocation to alternately admit pressure fluid through said passages to their respective pistons and adapted also to alternately discharge fluid through said passages and said outlet means.

2. A reciprocating tool actuating device comprising a cylinder body, a pair of opposed reciprocable pistons within said body, a rod extending between and connected at opposite ends to said pistons, a tube formed separately from said rod and disposed thereabout between said pistons, said tube and rod being movable axially with the pistons, said tube being spaced from said rod to form fluid passage means therebetween, said body containing pressure fluid inlet and outlet ducts, and the wall of said tube having aperture means communicating with said fluid passage means between the rod and tube and cooperating with said inlet and outlet ducts in accordance with movement of the tube to control the delivery of pressure fluid to and from the pistons for effecting reciprocation thereof.

3. A reciprocating tool actuating device as recited in claim 2, and including seal means received between said rod and tube at a location between the pistons and dividing said passage means into two separate passages each controlling the delivery of fluid to and its discharge from one of said pistons.

4. A reciprocating tool actuating device as recited in claim 3, and including a tool holder reciprocable relative to the body and attached to said rod for movement therewith.

5. A reciprocating tool actuating device comprising a handle body containing a pair of alined cylindrical bores, a partition in the body between said bores, a pair of opposed reciprocable pistons in said body bores respectively, a rod extending between and connected at its opposite ends to said pistons, a tube formed separately from said rod and disposed thereabout between said pistons, said tube and rod extending through an opening in said partition and being movable with the pistons, said tube being radially spaced from said rod to form fluid passage means therebetween, a resilient seal ring received between said rod and tube at a location between the pistons and dividing said passage means into two separate passages, said partition containing pressure fluid inlet and outlet ducts, the wall of said tube containing apertures opening into said passages and cooperating with said inlet and outlet ducts in accordance with movement of the tube to alternately admit fluid to and discharge it from said bores through said passages and thereby effect reciprocation of the pistons, and a tool holder connected to and reciprocable with said pistons.

6. A reciprocating tool actuating device as recited in claim 5, in which said tool holder extends alongside and generally parallel to said bores, and including a pair of lugs projecting from said tool holder and attached directly to opposite ends of said rod.

7. A reciprocating tool actuating device as recited in claim 6, including a pair of nuts threaded onto said opposite ends of said rod and tightening said lugs and pistons against said tube, and in which said body bores are opposite end portions of a single cylindrical bore and said partition is formed separately from the body and received in a central portion of said single bore.

ALMA A. HUTCHINS.

(References on following page)

REFERENCES CITED

The following references are of record in the file of this patent:

UNITED STATES PATENTS

| Number | Name | Date |
|---|---|---|
| 80,550 | Joy | Aug. 4, 1868 |
| 539,240 | Soley | May 14, 1895 |
| 1,195,549 | Baker | Aug. 22, 1916 |
| 1,238,062 | Ekstrom | Aug. 21, 1917 |
| 1,506,219 | Clark | Aug. 26, 1924 |
| 1,841,634 | Rolstad | Jan. 19, 1932 |
| 2,022,197 | Hampton | Nov. 26, 1935 |
| 2,255,395 | Spink | Sept. 9, 1941 |
| 2,350,779 | Lapkoff | June 6, 1944 |

FOREIGN PATENTS

| Number | Country | Date |
|---|---|---|
| 54,934 | Germany | Jan. 12, 1891 |